US012759847B2

(12) United States Patent
Morooka et al.

(10) Patent No.: US 12,759,847 B2
(45) Date of Patent: Oct. 13, 2026

(54) OVERHEAD CRANE MONITORING SYSTEM

(71) Applicant: NIPPON STEEL TEXENG. CO., LTD., Tokyo (JP)

(72) Inventors: Kiyokazu Morooka, Tokyo (JP); Hiroyuki Matsumoto, Tokyo (JP); Shingo Sasaki, Tokyo (JP); Ai Inazawa, Tokyo (JP); Yuuya Sakamoto, Tokyo (JP)

(73) Assignee: NIPPON STEEL TEXENG. CO., LTD., Tokyo (JP)

( * ) Notice: Subject to any disclaimer, the term of this patent is extended or adjusted under 35 U.S.C. 154(b) by 275 days.

(21) Appl. No.: 18/835,925

(22) PCT Filed: Feb. 6, 2023

(86) PCT No.: PCT/JP2023/003756

§ 371 (c)(1),
(2) Date: Aug. 5, 2024

(87) PCT Pub. No.: WO2023/176188

PCT Pub. Date: Sep. 21, 2023

(65) Prior Publication Data

US 2025/0145422 A1 May 8, 2025

(30) Foreign Application Priority Data

Mar. 17, 2022 (JP) ................................ 2022-042289

(51) Int. Cl.
*B66C 13/46* (2006.01)
*B66C 13/00* (2006.01)
(Continued)

(52) U.S. Cl.
CPC .............. *B66C 13/46* (2013.01); *B66C 13/00* (2013.01); *B66C 13/40* (2013.01); *B66C 17/00* (2013.01); *H04N 23/698* (2023.01)

(58) Field of Classification Search
CPC ......... B66C 13/46; B66C 13/40; B66C 17/00; B66C 13/00; H04N 23/698
See application file for complete search history.

(56) References Cited

U.S. PATENT DOCUMENTS

2014/0054254 A1* 2/2014 Ogawa .................. B66C 15/065 212/276

FOREIGN PATENT DOCUMENTS

CN 213445850 U 6/2021
JP 5-246683 A 9/1993
(Continued)

*Primary Examiner* — Thomas Randazzo
(74) *Attorney, Agent, or Firm* — Birch, Stewart, Kolasch & Birch, LLP

(57) ABSTRACT

An overhead crane monitoring system is for monitoring an overhead crane (1). The overhead crane (1) includes a travelling body (2) that travels along rails (4), a traverse trolley (3) that travels in a direction perpendicular to a travelling direction of the travelling body (2) along the travelling body (2), and a hoisting device (5) mounted on the traverse trolley (3). The overhead crane monitoring system includes a panoramic camera (6) disposed at one end portion of the travelling body (2). The panoramic camera (6) records an image in an overlooking posture. The image recorded by the panoramic camera (6) is displayed on a wide display (21) installed in a remote operation room. This enables providing an operator with an image appropriate for remotely operating the overhead crane (1).

7 Claims, 6 Drawing Sheets

(51) Int. Cl.
*B66C 13/40* (2006.01)
*B66C 17/00* (2006.01)
*H04N 23/698* (2023.01)

(56) References Cited

FOREIGN PATENT DOCUMENTS

| | | | | |
|---|---|---|---|---|
| JP | 2002-274779 A | 9/2002 | | |
| JP | WO-2012001994 A1 * | 1/2012 | ............. | B66C 13/22 |
| JP | 2012-30948 A | 2/2012 | | |

* cited by examiner

OVERHEAD CRANE MONITORING SYSTEM

TECHNICAL FIELD

The present invention relates to an overhead crane monitoring system.

BACKGROUND ART

An overhead crane is installed for, for example, a material storage area. In order for the practical application of remote operation of the overhead crane, it is required to establish an overhead crane monitoring system that enables monitoring of the overhead crane and the vicinity of the overhead crane from a remote operation room.

Patent Literature 1 discloses an overhead crane operating device and a configuration in which a video camera that captures working conditions of an overhead crane is disposed.

Patent Literature 2 discloses an operation method of a container crane, a transfer crane, an unloader, and the like, which records states of a placed load and a hoisted load by a camera mounted on a trolley, transmits its image to a display device disposed on the ground, and causes an operator to perform a hoisting operation of the placed load or a placing operation of the hoisted load from an operation panel disposed on the ground or near the ground based on the image displayed on the display device.

CITATION LIST

Patent Literature

Patent Literature 1: Japanese Laid-open Patent Publication No. 2002-274779

Patent Literature 2: Japanese Laid-open Patent Publication No, 05-246683

SUMMARY OF INVENTION

Technical Problem

While in Patent Literature 1, a camera installed on the ground records an overhead crane, upon practical application of remote operation of the overhead crane, it is required to identify human entry to a ground area and states of materials and facilities, and therefore, an image from a perspective of an operator cabin on the overhead crane (on the machine) is necessary.

While in Patent Literature 2, three cameras mounted on a trolley records states of a placed load and a hoisted load, an operator who watches them needs to combine the images recorded from a plurality of different directions in his/her mind, which may burden the operator to possibly lead to a failure in quick decision making.

The present invention has been made in consideration of the above-described circumstances, and it is an object of the present invention to provide an operator with an image appropriate for remotely operating an overhead crane.

Solution to Problem

An overhead crane monitoring system of the present invention is for monitoring an overhead crane. The overhead crane includes a travelling body that travels along rails, a traverse trolley that travels in a direction perpendicular to a travelling direction of the travelling body along the travelling body, and a hoisting device mounted on the traverse trolley. The overhead crane monitoring system includes a panoramic camera disposed at one end portion of the travelling body. The panoramic camera records an image in an overlooking posture.

Advantageous Effects of Invention

The present invention enables providing an operator with an image appropriate for remotely operating the overhead crane.

DESCRIPTION OF EMBODIMENTS

The following describes a preferred embodiment of the present invention with reference to attached drawings.

Figure 1:
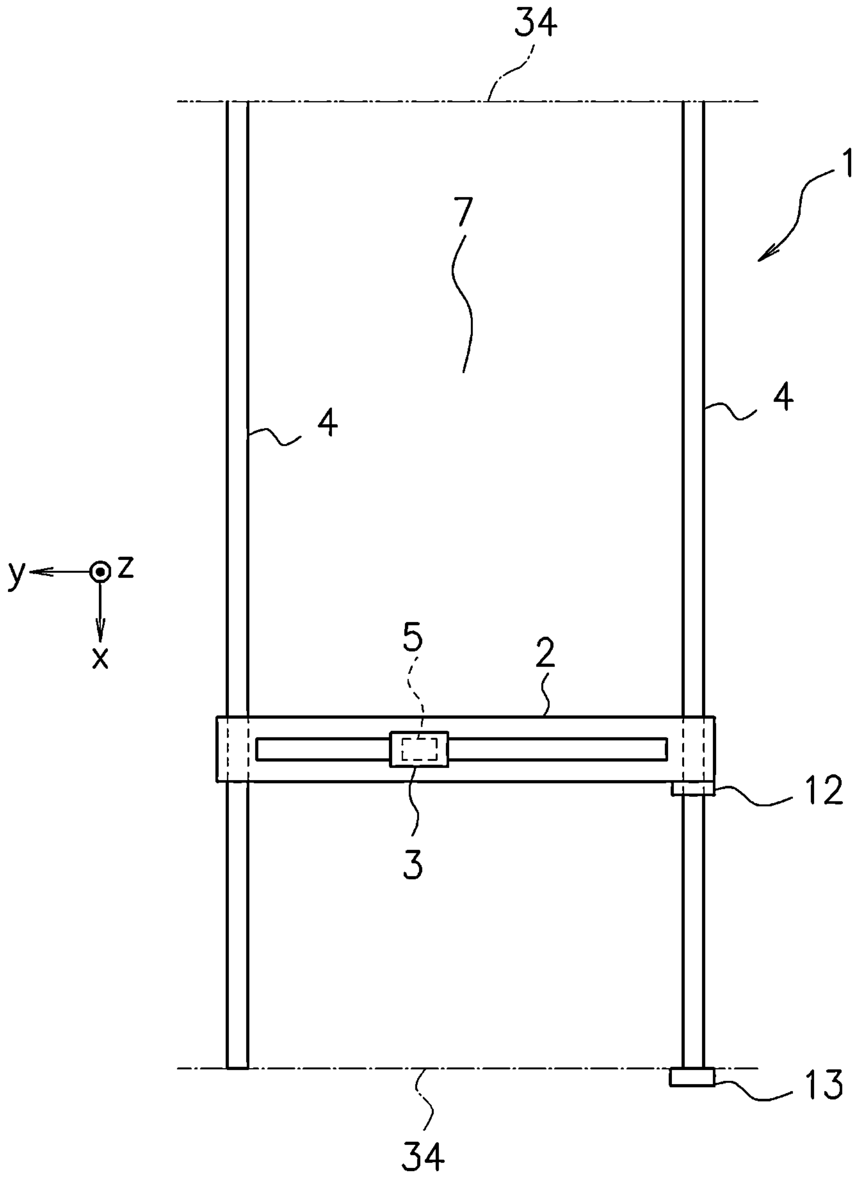
FIG. 1 is a drawing illustrating a schematic configuration of an overhead crane.
Figure 2:
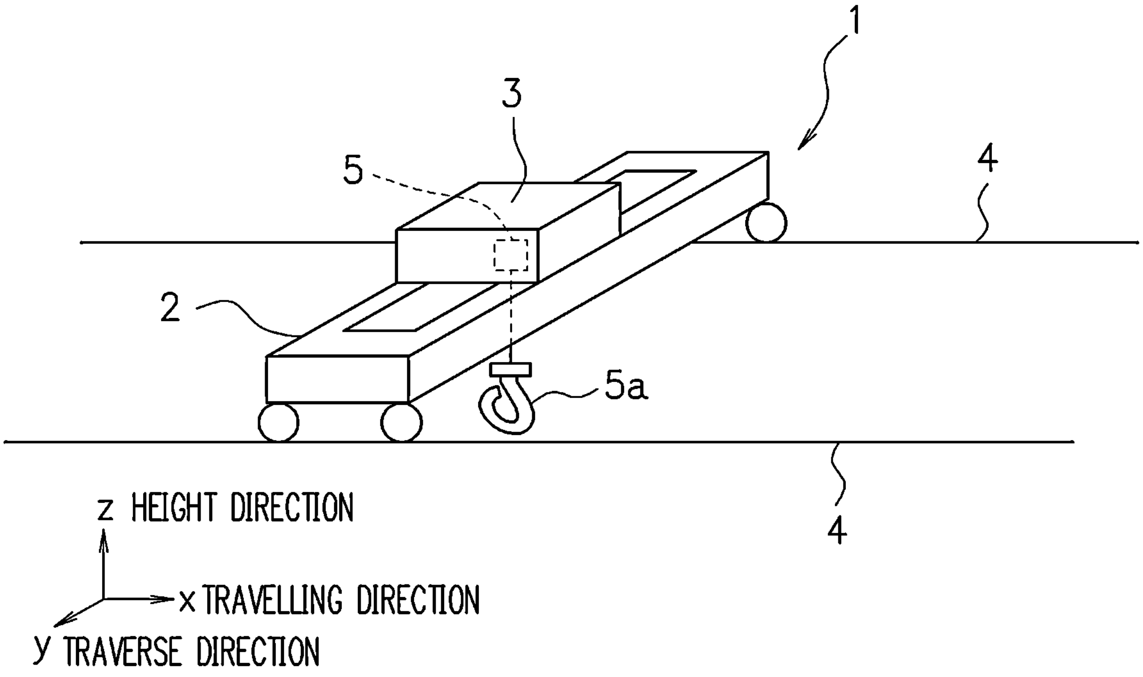
FIG. 2 is a drawing illustrating the schematic configuration of the overhead crane.

FIG. 1 and FIG. 2 illustrate a schematic configuration of an overhead crane 1. FIG. 1 is a plan view schematically illustrating the overhead crane 1, and FIG. 2 is a perspective view schematically illustrating the overhead crane 1.

The overhead crane 1 is installed for a storage area 7 inside a building, and conveys materials placed on the storage area 7 by suspending.

The overhead crane 1 includes a pair of rails 4 installed in the building, a travelling body 2 that travels along the rails 4, a traverse trolley 3 that travels along the travelling body 2, and a hoisting device 5 mounted on the traverse trolley 3. The traverse trolley 3 travels in a direction perpendicular to the travelling direction of the travelling body 2. The hoisting device 5 hoists or lowers a hoisting tool 5*a*, such as a hook, and suspends a hoisted load (material) placed on the storage area 7. In this application, the travelling direction (the extending direction of the rails 4) is defined as an x-direction, the traverse direction that is the travelling direction of the traverse trolley 3 is defined as a y-direction, and the height direction is defined as a z-direction.

Figure 3A:
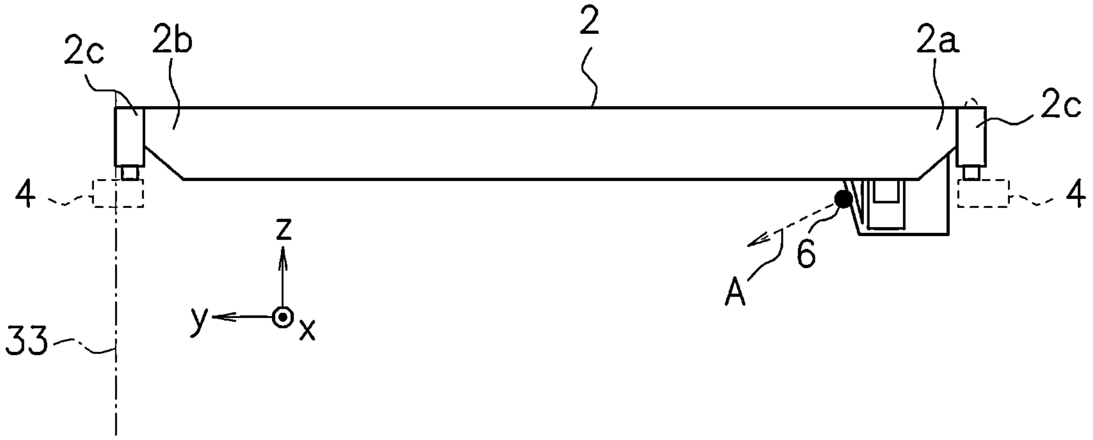
FIG. 3A is a front view of a travelling body (a traverse trolley is omitted).
Figure 3B:
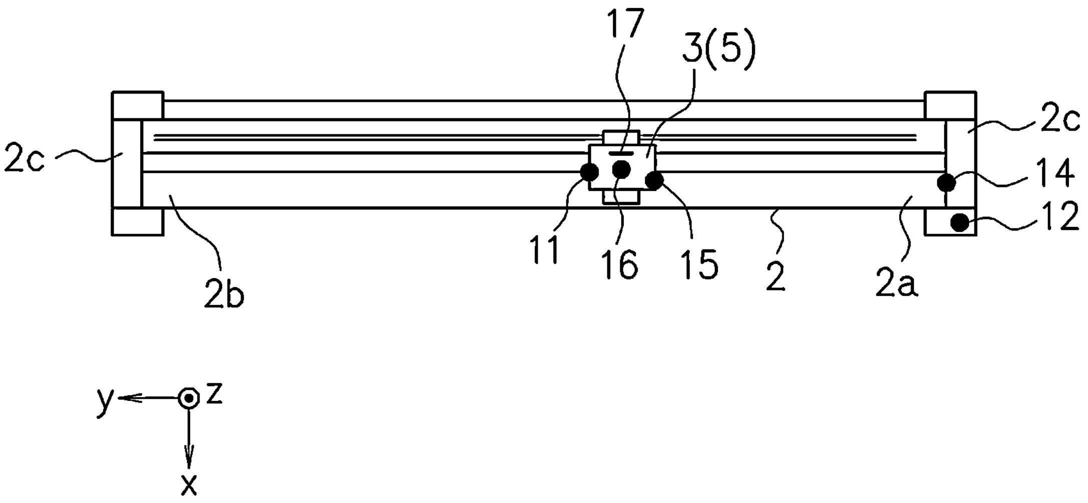
FIG. 3B is a plan view of the travelling body.

FIG. 3A and FIG. 3B illustrate an exemplary configuration of the travelling body 2. FIG. 3A is a front view of the travelling body 2 (the traverse trolley 3 is omitted), and FIG. 3B is a plan view of the travelling body 2.

The travelling body 2 is what is called a crane girder or the like, and is a long material extending in the y-direction, whose both ends have saddles 2*c* supported by the rails 4.

As illustrated in FIG. 3A, the travelling body 2 has one end portion 2*a* on which a panoramic camera 6 is installed at a lower portion. The panoramic camera 6 has a recording direction arranged, for example, to look downward like a sight direction of a human looking down on the hoisted load from an operator cabin on the machine as indicated by the arrow A, and records in an overlooking posture. The panoramic camera 6 has a horizontal viewing angle of 180°, and is arranged to have the traverse direction (y-direction) as a center of the horizontal viewing angle at the one end portion 2*a* of the travelling body 2.

Figure 4:
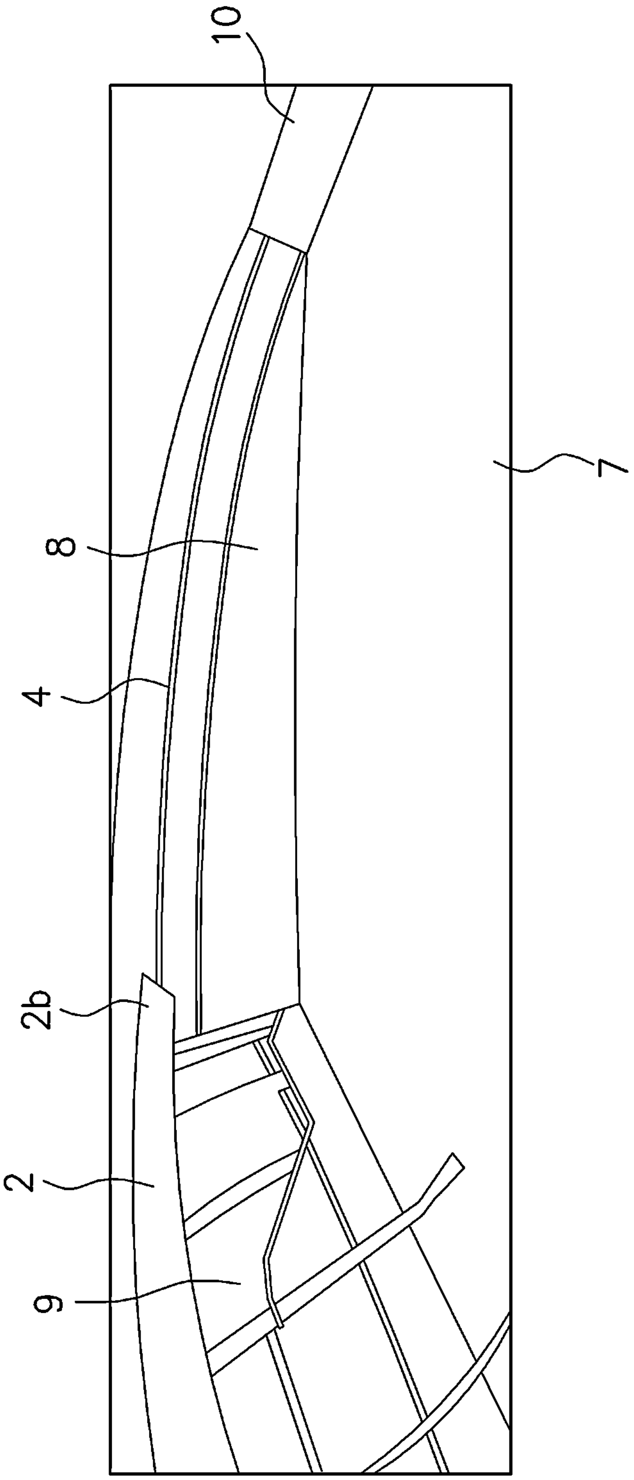
FIG. 4 is a drawing schematically illustrating an image recoded by a panoramic camera.

Here, with reference to FIG. 4, the image recorded by the panoramic camera 6 will be described, FIG. 4 is a drawing schematically illustrating an image recorded by the panoramic camera 6. As illustrated in FIG. 4, the image recorded by the panoramic camera 6 captures the storage area (the floor of the building) 7 below the overhead crane 1. The image recorded by the panoramic camera 6 captures a wall 8 and the rail 4 on a side of another end portion 2*b* of the travelling body 2. The image recorded by the panoramic camera captures both walls 9, 10 in the travelling direction (x-direction). The image recorded by the panoramic camera 6 captures the travelling body 2, on which the panoramic camera 6 is mounted, extending toward its far side direction. Although the image recorded by the panoramic camera 6 changes as the travelling position of the travelling body 2 changes, what has been mentioned here are constantly captured.

Note that another camera may be installed on the travelling body 2, the traverse trolley 3, or on the ground in addition to the panoramic camera 6, In this embodiment, there is installed a camera 11 on the traverse trolley 3 as illustrated in FIG. 3B to record the states of the hoisting tool 5*a* and the hoisted load.

As illustrated in FIG. 1 and FIG. 3B, a laser range finder 12 is installed on the travelling body 2, and a reflective plate 13 is installed in the proximity of an end portion of the rail 4 to face the laser range finder 12. These laser range finder 12 and reflective plate 13 enable measuring the travelling position of the travelling body 2. In this embodiment, the laser range finder 12 and the reflective plate 13 function as travelling position measuring means in the present invention. Note that it is allowed to configure the travelling position measuring means by using, for example, an IR cable, an IC tag, or the like, other than the laser range finder.

As illustrated in FIG. 3B, a laser range finder 14 is installed on the travelling body 2, and a reflective plate 15 is installed on the traverse trolley 3 to face the laser range finder 14. These laser range finder 14 and reflective plate 15 enable measuring the traverse position of the traverse trolley 3. In this embodiment, the laser range finder 14 and the reflective plate 15 function as traverse position measuring means in the present invention. Note that it is allowed to configure the traverse position measuring means by using, for example, an IR cable, an IC tag, or the like, other than the laser range finder.

As illustrated in FIG. 3B, the hoisting device 5 has a portion that relatively rotates when the hoisting tool 5*a* is hoisted or lowered, one side of which has a rotation detector 16 and the other side of which has a reflection mark 17. These rotation detector 16 and reflection mark 17 enables measuring a height position of the hoisting tool 5*a* by the hoisting device 5. In this embodiment, the rotation detector 16 and the reflection mark 17 function as height position measuring means in the present invention, Note that it is allowed to configure the height position measuring means by using, for example, a pulse generator or the like, other than the rotation detector.

Figure 5:
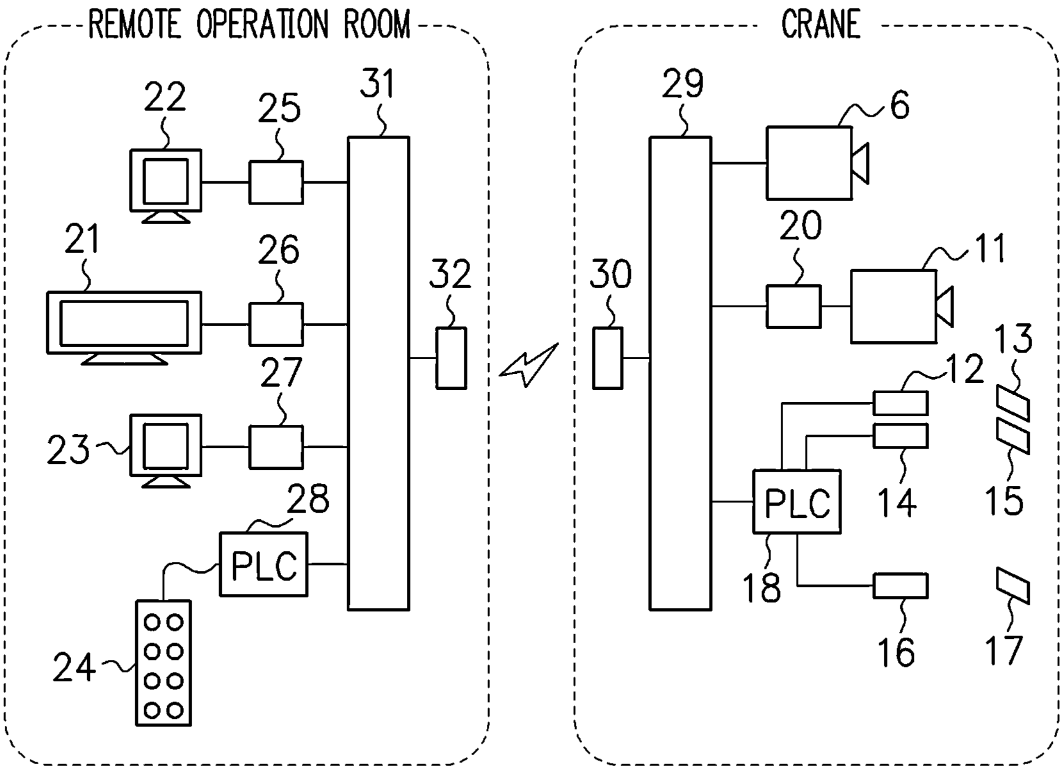
FIG. 5 is a drawing illustrating an exemplary network configuration of an overhead crane monitoring system.

FIG. 5 illustrates an exemplary network configuration of an overhead crane monitoring system.

As described above, the panoramic camera 6 is installed on the overhead crane 1. The panoramic camera 6 communicates with a component of the remote operation room in a wireless manner via a hub 29 and a communication device 30.

The camera 11 is also installed on the overhead crane 1. The camera 11 communicates with a component of the remote operation room in a wireless manner via an encoder 20, the hub 29, and the communication device 30.

The laser range finder 12 and the reflective plate 13 functioning as the travelling position measuring means, the laser range finder 14 and the reflective plate 15 functioning as the traverse position measuring means, and the rotation detector 16 and the reflection mark 17 functioning as the height position measuring means are also installed on the overhead crane 1, The laser range finder 12, the laser range finder 14, and the rotation detector 16 communicate with a component of the remote operation room in a wireless manner via a PLC (programmable logic controller) 18, the hub 29, and the communication device 30.

On the other hand, a display 21 that displays an image recorded by the panoramic camera 6 is installed in the remote operation room. For the display 21 that displays the image recorded by the panoramic camera 6, a wide display referred to as an ultra-wide monitor and the like is used. The display 21 communicates with a component of the overhead crane 1 in a wireless manner via a decoder 26, a hub 31, and a communication device 32.

A display 22 that displays an image recorded by the camera 11 is installed in the remote operation room. The display 22 communicates with a component of the overhead crane 1 in a wireless manner via a decoder 25, the hub 31, and the communication device 32.

A display 23 that displays information, such as the travelling position of the travelling body 2, the traverse position of the traverse trolley 3, and the height position of the hoisting tool 5*a*, is installed in the remote operation room. The display 23 communicates with a component of the overhead crane 1 in a wireless manner via a computer 27, the hub 31, and the communication device 32.

A controller 24, such as a pendant switch, for remote operation is installed in the remote operation room. The controller 24 communicates with a component of the overhead crane 1 in a wireless manner via a PLC 28, the hub 31, and the communication device 32. There is an already-existing controller (not illustrated), such as a pendant switch, on the overhead crane 1 as a work site. In the case of, for example, a wireless disconnection due to a PLC health check, the crane operation is stopped and is automatically switched to an operation with the already-existing controller at the work site.

Note that the network configuration illustrated in FIG. 5 is one example, and a camera other than those illustrated may be installed. When a plurality of cameras are used, it is preferred to install a display for each camera in the remote operation room.

It is also allowed to install a speaker on the overhead crane 1 so as to make a loudspeaker announcement from a microphone installed in the remote operation room. This allows, for example, calling for attention of field workers. It is also allowed to install a sound collecting microphone on the overhead crane 1, and play the sound on a speaker installed in the remote operation room. This allows the atmosphere in the work site to be confirmed in the remote operation room.

Figure 6:
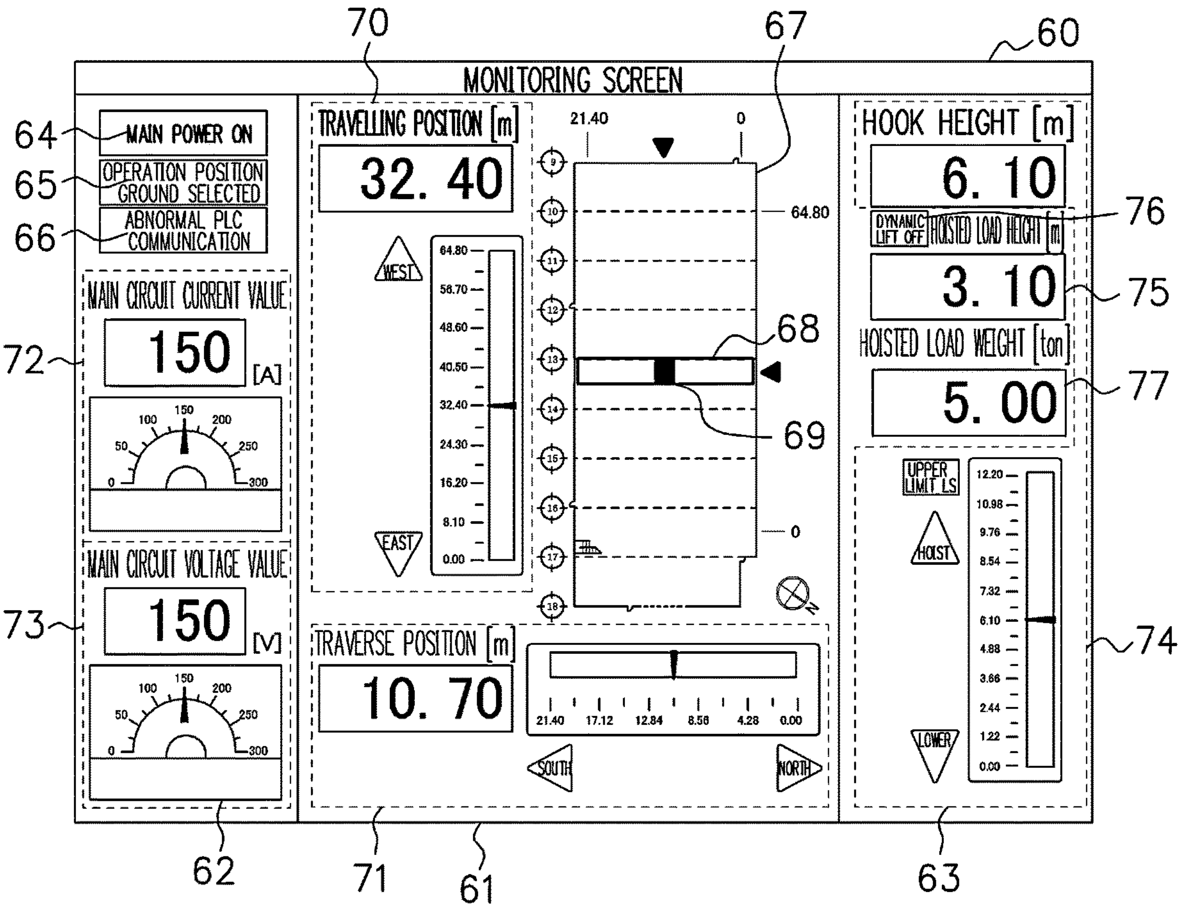
FIG. 6 is a drawing illustrating an example of a monitoring image.

Here, a display example of the display 23 will be described with reference to FIG. 6, FIG. 6 is a drawing illustrating an example of a monitoring image 60 displayed on the display 23.

As illustrated in FIG. 6, the display 23 displays the monitoring image 60 under control of the computer 27 functioning as display control means. The monitoring image

60 has a center where a display area 61 that displays the travelling position and the traverse position is arranged. A display area 62 that displays a main circuit condition is arranged on the left side of the display area 61, and a display area 63 that displays the height position is arranged on the right side.

A main power supply state display 64 displays an ON/OFF state of a main power supply. The main power supply state display 64, for example, lights up when it is ON, and lights off when it is OFF.

An operation position state display 65 displays a state of an operation position changeover switch. The operation position state display 65, for example, lights up when the operation position is on the ground, and lights off when it is on the machine.

A PLC communication state display 66 displays a communication state between the ground and the PLC on the machine. The PLC communication state display 66, for example, lights off when the communication state is normal, and lights up when it is abnormal.

In the display area 61, there is displayed a map 67 schematically representing a layout of the building in plan view. On the map 67, a first indication part 68 representing the travelling body 2 and a second indication part 69 representing the traverse trolley 3 are displayed. The vertical direction in the monitoring image 60 corresponds to the travelling direction (x-direction), and the lateral direction corresponds to the traverse direction (y-direction). Based on the travelling position of the travelling body 2 and the traverse position of the traverse trolley 3 measured by the laser range finders 12, 14 and the reflective plates 13, 15, the indication parts 68, 69 move on the map 67, The travelling position of the travelling body 2 and the traverse position of the traverse trolley 3 are thus graphically displayed.

On the left of the map 67, a travelling position display 70 is arranged. The travelling position display 70 displays the travelling position of the travelling body 2 by numerical value and indicator display. The travelling position of the travelling body 2 is simply represented by, for example, distance setting any one end position in the travelling direction as a starting point. The travelling position of the travelling body 2 is measured by the laser range finder 12 and the reflective plate 13, and the measured value is reflected on the travelling position display 70.

A traverse position display 71 is arranged below the map 67. The traverse position display 71 displays the traverse position of the traverse trolley 3 by numerical value and indicator display. The traverse position of the traverse trolley 3 is simply represented by, for example, distance setting any one end position in the traverse direction as a starting point. The traverse position of the traverse trolley 3 is measured by the laser range finder 14 and the reflective plate 15, and the measured value is reflected on the traverse position display 71.

Note that, the dotted lines are virtual lines for indicating display areas configuring the travelling position display 70 and the traverse position display 71, respectively, and are not displayed on the monitoring image 60.

In the display area 62, a main circuit current value display 72 displays a current value of the main circuit power supply of the overhead crane 1 by numerical value and meter display. The current value of the main circuit power supply is measured by an ammeter, which is not illustrated, and the measured value is reflected on the main circuit current value display 72.

A main circuit voltage value display 73 displays a voltage value of the main circuit power supply of the overhead crane 1 by numerical value and meter display. The voltage value of the main circuit power supply is measured by a voltmeter, which is not illustrated, and the measured value is reflected on the main circuit voltage value display 73.

Note that the dotted lines are virtual lines for indicating display areas configuring the main circuit current value display 72 and the main circuit voltage value display 73, respectively, and are not displayed on the monitoring image 60.

In the display area 63, a hook height display 74 displays the height position of the hoisting tool 5*a* by numerical value and indicator display. The height position of the hoisting tool 5*a* by the hoisting device 5 is measured by the rotation detector 16 and the reflection mark 17, and the measured value is reflected on the hook height display 74.

Note that the dotted line is a virtual line for indicating a display area configuring the hook height display 74, and is not displayed on the monitoring image 60.

A hoisted load height display 75 displays the height of the bottom side of the hoisted load from the ground by numerical value indication. After slinging the hoisted load, a button 76 is pressed when a dynamic lift off check is completed, and thus, the display on the hoisted load height display 75 is set. The numerical value displayed on the hoisted load height display 75 may be, for example, a numerical value based on sensors, or a numerical value input by a user.

A hoisted load weight display 77 displays a hoisted load weight by numerical value indication. The numerical value displayed on the hoisted load weight display 77 may be, for example, a numerical value based on sensors, or a numerical value input by a user.

Thus, indicating the states of the overhead crane 1 in a quantified manner allows an operator to accurately identify the states of the overhead crane 1, thereby enabling a precise remote operation, such as inching. Moreover, graphically displaying the travelling position of the travelling body 2 and the traverse position of the traverse trolley 3 by using the map 67 and the indication parts 68, 69, the operator can visually and intuitively identify the states of the overhead crane 1.

The overhead crane monitoring system arranged as above enables providing an operator with an image appropriate for remotely operating the overhead crane 1.

As illustrated in FIG. 4, the image recorded by the panoramic camera 6 is equal to an image from the operator cabin perspective on the machine. The operator in the remote operation room is provided with the image, and thus, the operator can identify the states of the overhead crane 1, human entry to the ground area, and the states of materials and facilities in a manner close to watching with the naked eyes on the machine, and monitor the overhead crane 1 and the periphery of the overhead crane 1.

Moreover, displaying the image recorded by the panoramic camera 6 on the one wide display 21 allows a seamless image display. For example, displaying the image recorded by the panoramic camera 6 on a plurality of displays in a divided manner requires identifying relationships among overlapped portions and the like in the images among the displays, which may require time in thought process of the operator. In contrast, displaying the image recorded by the panoramic camera 6 on the one wide display 21 spares the necessity of identifying the relationships among the overlapped portions and the like in the images among the displays, thereby allowing reduced burden on the operator.

Thus, a wide range view from the remote operation room is enabled, accurate situation assessments regarding the states of the overhead crane 1, the human entry to the ground area, and the states of the materials and the facilities are enabled, and operability equal to operability from the operator cabin on the machine is ensured, thereby the practical application of the remote operation is possible.

Note that, for the panoramic camera 6, one that has a horizontal viewing angle of 180° or more is preferred, but one that has a horizontal viewing angle of less than 180° is also allowed. In this case, it is possible that only one of the walls 9, 10 in the travelling direction (x-direction) is captured or neither of them is captured in the image recorded by the panoramic camera 6, and if it is fine like that, the panoramic camera 6 with the horizontal viewing angle of less than 180° may be employed.

As illustrated in FIG. 6, the numerical value of the travelling position of the travelling body 2 and the numerical value of the traverse position of the traverse trolley 3 measured by the laser range finders 12, 14 and the reflective plates 13, 15, and the numerical value of the height position of the hoisting tool 5*a* measured by the rotation detector 16 and the reflection mark 17 may be, for example, displayed on the wide display 21 in a manner superimposed over the image recorded by the panoramic camera 6.

While the present invention has been described together with the embodiment above, the above embodiment merely illustrates concrete examples of implementing the present invention, and the technical scope of the present invention is not to be construed in a restrictive manner by the embodiment. That is, the present invention may be implemented in various forms without departing from the technical spirit or main features thereof.

While in the embodiment, there has been described the example where the overhead crane 1 is installed indoor (inside the building), the present invention is applicable to the case where the overhead crane 1 is installed outdoor. While there has been described that the image recorded by the panoramic camera 6 captures the wall 8 on the other end portion 2*b* side of the travelling body 2, the wall does not exist when the overhead crane 1 is installed outdoor. Therefore, the image recorded by the panoramic camera 6 is simply set as follows. That is, in both cases of the overhead crane 1 being installed indoor and outdoor, the image recorded by the panoramic camera 6 is set to capture the storage area (the floor when indoor, and the ground when outdoor) below the overhead crane 1 and a virtual vertical plane 33 (an xz-plane 33 illustrated in FIG. 3A) perpendicular to the traverse direction (y-direction) at an end surface position of the other end portion 2*b* of the travelling body 2.

Similarly, while there has been described that the image recorded by the panoramic camera 6 captures both the walls 9, 10 in the travelling direction (x-direction), the walls do not exist when the overhead crane 1 is installed outdoor. Therefore, it is preferred to set the image recorded by the panoramic camera 6 as follows. That is, in both cases of the overhead crane 1 being installed indoor and outdoor, it is preferred that the image recorded by the panoramic camera 6 captures a virtual vertical plane 34 (an yz-plane 34 illustrated in FIG. 1) perpendicular to the travelling direction (x-direction) in both the end positions in the travelling direction.

The invention claimed is:

1. An overhead crane monitoring system for monitoring an overhead crane, the overhead crane comprising:

a travelling body that travels along rails;

a traverse trolley that travels in a direction perpendicular to a travelling direction of the travelling body along the travelling body; and a hoisting device mounted on the traverse trolley, wherein the overhead crane monitoring system comprises a panoramic camera disposed at one end portion of the travelling body, the panoramic camera recording an image in an overlooking posture.

2. The overhead crane monitoring system according to claim 1, wherein the panoramic camera has a horizontal viewing angle of 180° or more, and is arranged so as to set the traverse direction as the travelling direction of the traverse trolley as a center of the horizontal viewing angle.

3. The overhead crane monitoring system according to claim 1, wherein a wide display that displays the image recorded by the panoramic camera is installed in a remote operation room.

4. The overhead crane monitoring system according to claim 1, wherein the image recorded by the panoramic camera captures a storage area below the overhead crane and a virtual vertical plane perpendicular to a traverse direction as a travelling direction of the traverse trolley in an end surface position of another end portion of the travelling body.

5. The overhead crane monitoring system according to claim 4, wherein the image recorded by the panoramic camera captures virtual vertical planes perpendicular to the travelling direction at both end positions in the travelling direction.

6. The overhead crane monitoring system according to claim 1 comprising:

travelling position measuring device that measures a travelling position of the travelling body;

traverse position measuring device that measures a traverse position of the traverse trolley;

height position measuring device that measures a height position of a hoisting tool by the hoisting device; and a computer that controls to display the travelling position of the travelling body measured by the travelling position measuring device, the traverse position of the traverse trolley measured by the traverse position measuring device, and the height position of the hoisting tool measured by the height position measuring device on the display installed in the remote operation room using a monitoring image.

7. The overhead crane monitoring system according to claim 6, wherein the computer:

displays a first indication part representing the travelling body and a second indication part representing the traverse trolley on the monitoring image; and moves the first indication part and the second indication part on the monitoring image based on the travelling position of the travelling body measured by the travelling position measuring device and the traverse position of the traverse trolley measured by the traverse position measuring device.

* * * * *